United States Patent
Pritchard et al.

(10) Patent No.: US 9,517,691 B1
(45) Date of Patent: Dec. 13, 2016

(54) TWO MOTOR E-ASSIST AWD

(71) Applicant: BorgWarner Inc., Auburn Hills, MI (US)

(72) Inventors: Larry A. Pritchard, Macomb, MI (US); Thaddeus Kopp, Oakland Township, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 14/811,880

(22) Filed: Jul. 29, 2015

(51) Int. Cl.
| | |
|---|---|
| *F16H 3/72* | (2006.01) |
| *F16H 48/08* | (2006.01) |
| *B60K 6/52* | (2007.10) |
| *F16H 1/14* | (2006.01) |
| *B60K 6/365* | (2007.10) |
| *B60K 17/348* | (2006.01) |

(52) U.S. Cl.
CPC ............... *B60K 6/52* (2013.01); *B60K 6/365* (2013.01); *B60K 17/348* (2013.01); *F16H 1/14* (2013.01); *B60Y 2200/92* (2013.01); *B60Y 2400/73* (2013.01); *B60Y 2400/80* (2013.01); *Y10S 903/91* (2013.01); *Y10S 903/916* (2013.01)

(58) Field of Classification Search
None
See application file for complete search history.

(56) References Cited

U.S. PATENT DOCUMENTS

| | | | | |
|---|---|---|---|---|
| 2001/0009878 A1* | 7/2001 | Kaneko | ............... | B60L 11/123 475/5 |
| 2001/0011612 A1* | 8/2001 | Takenaka | ............... | B60K 6/365 180/65.1 |
| 2002/0019284 A1* | 2/2002 | Aikawa | ............... | B60K 1/00 475/150 |
| 2004/0011576 A1* | 1/2004 | Taniguchi | ............... | B60K 6/26 180/65.235 |
| 2005/0115755 A1* | 6/2005 | Sakai | ............... | B60K 6/36 180/243 |
| 2007/0093341 A1* | 4/2007 | Supina | ............... | B60K 6/365 475/5 |
| 2014/0011618 A1* | 1/2014 | Atarashi | ............... | B60K 6/387 475/5 |

OTHER PUBLICATIONS

U.S. Appl. No. 14/824,675, filed Aug. 12, 2015; Title: E-Assist With Torque Vectoring ; First named inventor: Larry A. Pritchard.

\* cited by examiner

*Primary Examiner* — Edwin A Young
(74) *Attorney, Agent, or Firm* — BrooksGroup

(57) ABSTRACT

A product may include an engine, and a transmission driven by the engine. An axle assembly may be driven by the engine through the transmission. An electrical machine may be connected to the axle assembly. The electrical machine may selectively drive the axle assembly and may be selectively drivable by the engine through the transmission and the axle assembly. A power transfer unit may be engaged between the electrical machine and the axle assembly.

25 Claims, 3 Drawing Sheets

TWO MOTOR E-ASSIST AWD

TECHNICAL FIELD

The field to which the disclosure generally relates includes vehicle drive systems and more particularly, includes vehicle drive systems that may include electric assist.

BACKGROUND

Vehicle drive systems may include a combustion engine, electric motor or other power plant for propulsion. Hybrid vehicles may include a combination of different types of power plants.

SUMMARY OF ILLUSTRATIVE VARIATIONS

According to a number of illustrative variations, a product may include an engine, and a transmission driven by the engine. An axle assembly may be driven by the engine through the transmission. An electrical machine may be connected to the axle assembly. The electrical machine may selectively drive the axle assembly and may be selectively drivable by the engine through the transmission and the axle assembly. A power transfer unit may be engaged between the electrical machine and the axle assembly.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
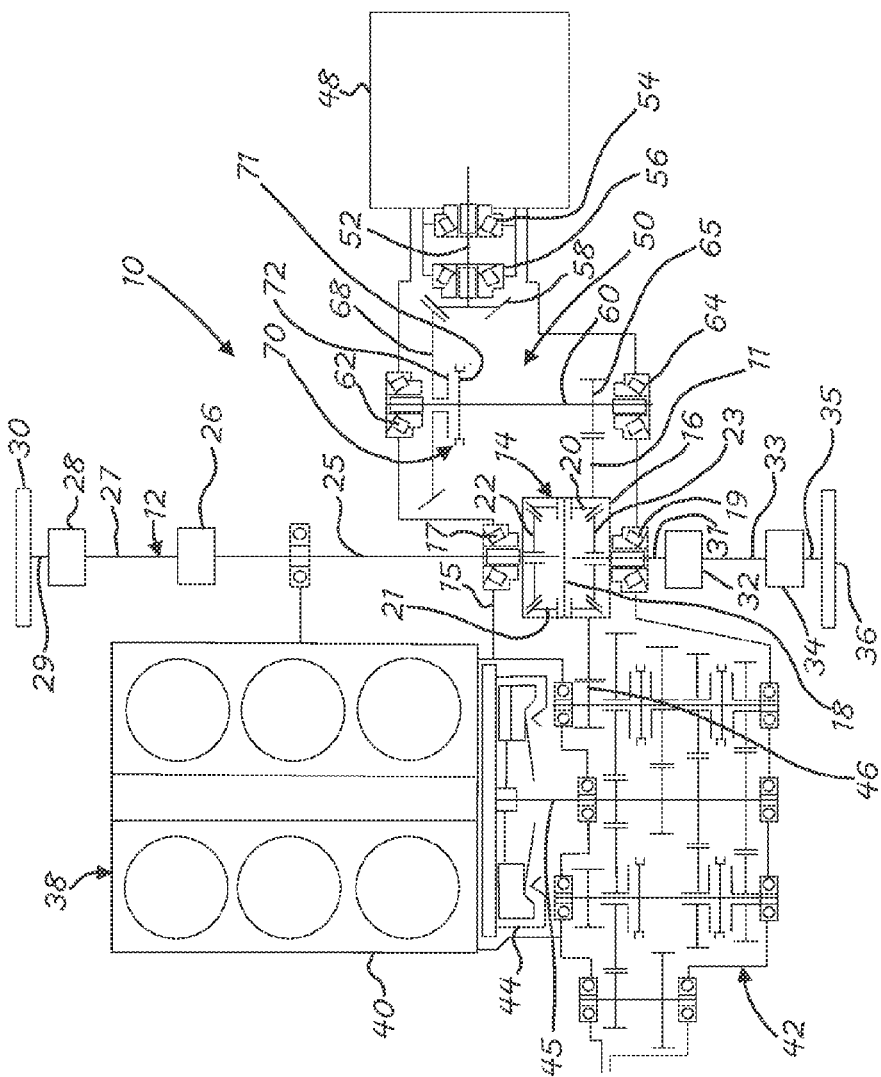
FIG. 1 is a schematic illustration of a product showing part of a vehicle powertrain according to a number of variations.

In a number of variations as illustrated in FIG. 1, a product 10 may include an axle assembly 12 that may include a differential unit 14. The differential unit 14 may include a cage 16 and may have a pinion shaft 18 that may be engaged at each of its ends with the cage 16. The cage 16 may be rotatable and may be carried in a housing 15 by bearings 17 and 19. A gear 11 may be engaged with the cage 16 to rotate therewith. The gear 11 may be a ring gear and may be a helical gear or a helical ring gear. The pinion shaft 18 may carry a pinion gear 20 and a pinion gear 21, each of which may be rotatable on the pinion shaft 18. A side gear 22 may mesh with each of the pinion gears 20, 21 and another side gear 23 may mesh with each of the pinion gears 20, 21. Rotation of the cage 16 may cause the pinion gears 20, 21 to rotate, which may cause the side gears 22, 23 to rotate.

In a number of variations the axle assembly 12 may include an axle shaft 25 that may have an end that may be engaged with the side gear 22 to rotate therewith and may have an end engaged with an inner joint 26, which may be a constant velocity joint that may transfer rotation of the axle shaft 25 to an axle shaft 27 and may allow for angular variation between the axle shafts 25 and 27. The shaft 27 may have an end connected with the inner joint 26 and another end connected with an outer joint 28. The outer joint 28 may be a constant velocity joint that may transfer rotation of the axle shaft 27 to an axle shaft 29 and may allow for angular variation between the axle shafts 27 and 29. The axle shaft 29 may rotatable and may carry a road wheel 30.

In a number of variations the axle assembly 12 may include an axle shaft 31 that may have an end that may be engaged with the side gear 23 to rotate therewith and may have an end engaged with an inner joint 32, which may be a constant velocity joint that may transfer rotation of the axle shaft 31 to an axle shaft 33 and may allow for angular variation between the axle shafts 31 and 33. The shaft 33 may have an end connected with the inner joint 32 and another end connected with an outer joint 34. The outer joint 34 may be a constant velocity joint that may transfer rotation of the axle shaft 33 to an axle shaft 35 and may allow for angular variation between the axle shafts 33 and 35. The axle shaft 35 may be rotatable and may carry a road wheel 36.

In a number of variations the product 10 may include a power source 38 which may include an engine 40, which may be an internal combustion engine, or another type of power source. The engine 40 may be connected with a multispeed transmission 42, and a torque converter 44 may be disposed between the transmission 42 and the engine 40. The transmission 42 may be of any construction such as a planetary gear transmission, or other type of transmission and may be automatic or manually actuated transmission, or a combination thereof. The transmission 42 may include a shaft 45 and a gear 46, with mechanisms to provide various forward, reverse and neutral gearing arrangements there between. The gear 46 may be an output gear and may be engaged with the gear 11. The transmission 42 may provide power from the engine 40 to the axle assembly 12 through the positive meshing gears 46 and 11.

In a number of variations an electrical machine 48 may be connected with the axle assembly 12 through a power transfer unit 50. The electrical machine 48 may be a motor or may be a motor-generator, or may be another type of electrical machine to provide power to the power transfer unit 50. A shaft 52, which may be a rotor shaft, or a segmented extension of the rotor shaft, may extend from the electrical machine 48 and may be supported by bearings 54 and 56. A gear 58 may be fixed to the shaft 52 to rotate therewith and may be disposed in the power transfer unit 50. In a number of variations a shaft 60 may extend in the power transfer unit 50 and may be supported for rotation by bearings 62 and 64. A gear 65 may be fixed to rotate with the shaft 60 and may mesh with, and may be positively engaged to rotate with, the gear 11. A gear 68 may be rotatable and may be carried around the shaft 60 and may mesh with, and may be positively engaged to rotate with, the gear 58 so as to be driven by the electrical machine 48 or alternatively, to drive the electrical machine 48. In a number of variations a disconnect mechanism 70 may be positioned around the shaft 60 and may include an element 71 that may be fixed to the shaft 60 to rotate therewith, and may include an element 72 that may be fixed to the gear 68 to rotate therewith. The disconnect mechanism 70 may be a clutch, synchronizer, or may be another mechanical device that may be constructed to engage and disengage the shaft 60 with the gear 68, which may be accomplished through the elements 71 and 72. In a number of variations the element 72 may be a disk that may be selectively captured by the element 71 to rotate therewith or may be selectively released by the element 71 so that rotation/power is not transferred between the shaft 60 and the gear 68. The element 71 may include a pressure plate and may have an actuator that may by mechanically, electrically, fluid or otherwise operated to selectively engage and/or disengage the elements 71 and 72. Engagement may be accomplished by clamping of the element 71 to the element 72.

In a number of variations operation of the product 10 may include a propulsion mode where power may be delivered from the power source 38 to the axle assembly 12 through the torque converter 44 and the transmission 42 to the axle assembly 12 at the gear 11. In this mode of operation the electrical machine 48 may be disconnected from the axle assembly 12 by disengagement of the disconnect mechanism 70, such as by release of the element 72 from the element 71. The electrical machine 48 may be connected with the axle assembly 12 for charging operating, with power supplied by the engine 40. In a number of variations with input from the road wheels 30, 36 the axle assembly 12 may drive the electrical machine 48 through the gear 11, the power transfer unit 50 and the shaft 52 to provide a charging mode wherein the electrical machine 48 may operate as a generator. In this mode of operation the electrical machine 48 may be connected to the axle assembly 12 by engagement of the elements 71, 72 in the disconnect mechanism 70. In a number of variations operation of the product 10 may include a propulsion mode where power may be delivered to the axle assembly 12 from the electrical machine 48 through the power transfer unit 50. In this mode of operation the electrical machine 48 may be connected to the axle assembly 12 by engagement of the elements 71 and 72 in the disconnect mechanism 70. Also in this mode of operation power may or may not be delivered to the axle assembly 12 from the engine 40 in either an electrical assist mode or electric only mode. The engine 40 may be powered off and the product 10 may operate in an electric sailing mode with any needed power supplied to the axle assembly 12 from the electrical machine 48.

Figure 2:
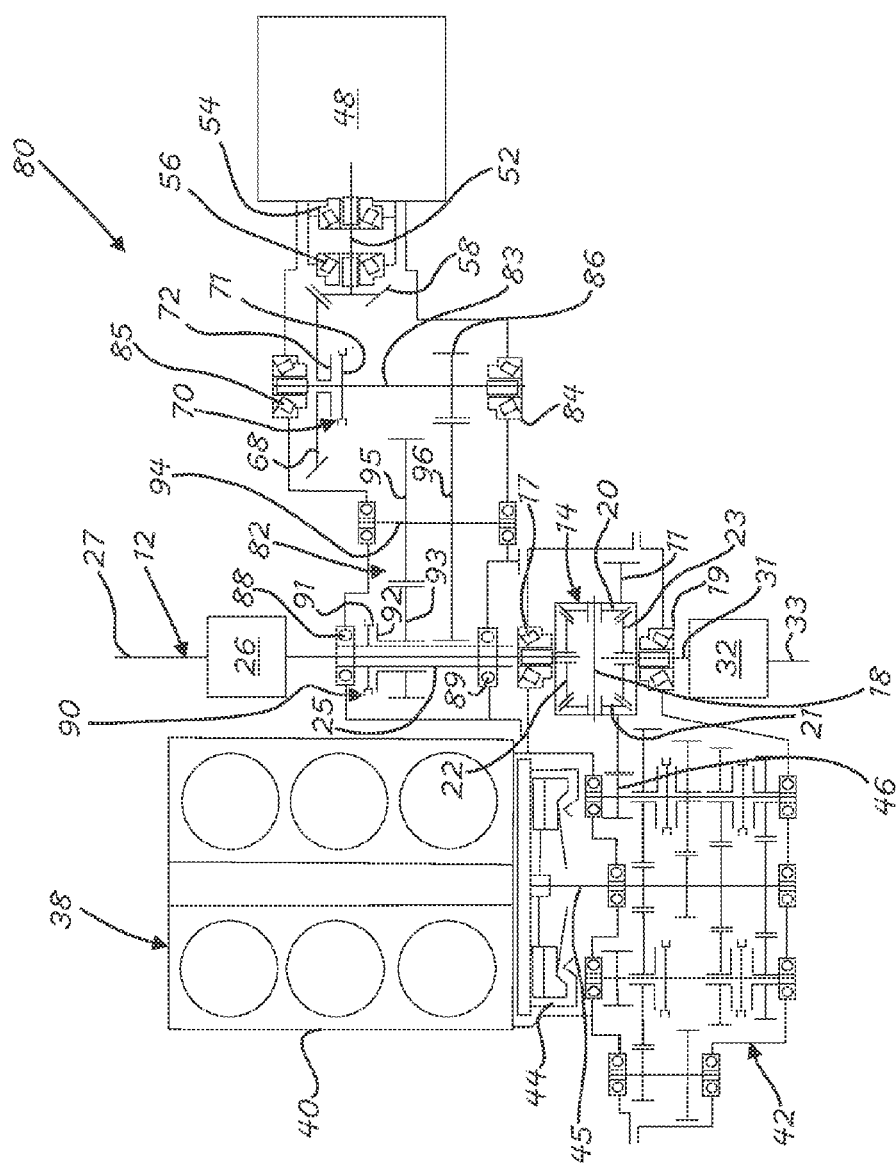
FIG. 2 is a schematic illustration of a product showing part of a vehicle powertrain according to a number of variations.

In a number of variations as illustrated in FIG. 2, a product 80 may include a power transfer unit 82. In FIG. 2 components that are like components of FIG. 1 are given the same reference numeral. The power transfer unit 82 may be connected between the axle assembly 12 and the electrical machine 48. The electrical machine 48 may be a motor or may be a motor-generator, or may be another type of electrical machine to provide power to the power transfer unit 82. A shaft 52, which may be a rotor shaft, or a segmented extension of the rotor shaft may extend from the electrical machine 48 and may be supported by bearings 54 and 56. A gear 58 may be fixed to the shaft 52 to rotate therewith and may be disposed in the power transfer unit 82. In a number of variations a shaft 83 may extend in the power transfer unit 82 and may be supported for rotation by bearings 84 and 85. A gear 86 may be fixed on the shaft 83. A gear 68 may be rotatable and may be carried around the shaft 83 and may mesh with and may be positively engaged with the gear 58 to be driven by the electrical machine 48 or alternatively to drive the electrical machine 48. In a number of variations a disconnect mechanism 70 may be positioned around the shaft 83 and may include an element 71 that may be fixed to the shaft 83 to rotate therewith, and may include an element 72 that may be fixed to the gear 68 to rotate therewith. The disconnect mechanism 70 may be a clutch or may be another mechanical device that may be constructed to engage and disengage the shaft 83 with the gear 68 which may be accomplished through the elements 71 and 72. In a number of variations the element 72 may be a disk that may be captured by the element 71 to rotate therewith or may be released by the element 71, so that rotation/power is not transferred between the shaft 83 and the gear 68.

In a number of variations the axle shaft 25 may extend through the power transfer unit 82 and may be supported for rotation by bearings 88 and 89. In a number of variations a disconnect mechanism 90 may be positioned around the shaft 25 and may include an element 91 that may be fixed to the shaft 25 to rotate therewith, and may include an element 92 that may be fixed to or formed as part of a gear 93 to rotate therewith. The disconnect mechanism 90 may be a clutch, synchronizer, or may be another mechanical device that may be constructed to engage and disengage the shaft 25 with the gear 93 which may be accomplished through the elements 91 and 92. In a number of variations the element 92 may be a disk that may be captured by the element 91 to rotate therewith or may be released by the element 91 so that rotation/power is not transferred between the shaft 25 and the gear 93.

In a number of variations the power transfer unit may include a shaft 94 that may carry a gear 95 and a gear 96 each fixed to rotate with the shaft 94 and there through with each other. The gear 96 may be larger than the gear 95 and may have a larger diameter. The gear 95 may mesh with and may be positively engaged with the gear 93. The gear 96 may mesh with and may be positively engaged with the gear 86. When the disconnect mechanism is engaged, rotation and power may be transferred between the axle assembly 12 and the electrical machine 48 through the power transfer unit 82. The power flow may be directed, in order from the axle shaft 25 through the disconnect mechanism 90, the gear 93, the gear 95, the shaft 94, the gear 96, the gear 86, the shaft 83, the disconnect mechanism 70, the gear 68, the gear 58, and the shaft 52 to the electrical machine 48. The power flow may be directed in the opposite order from the electrical machine 48 to the axle assembly 12. The gears 95 and 96 may be combined into a stepped gear without an intervening shaft. The reduction ratio between the gear 58 and the gear 93 may advantageously be 16:1, or approximately 16:1.

Figure 3:
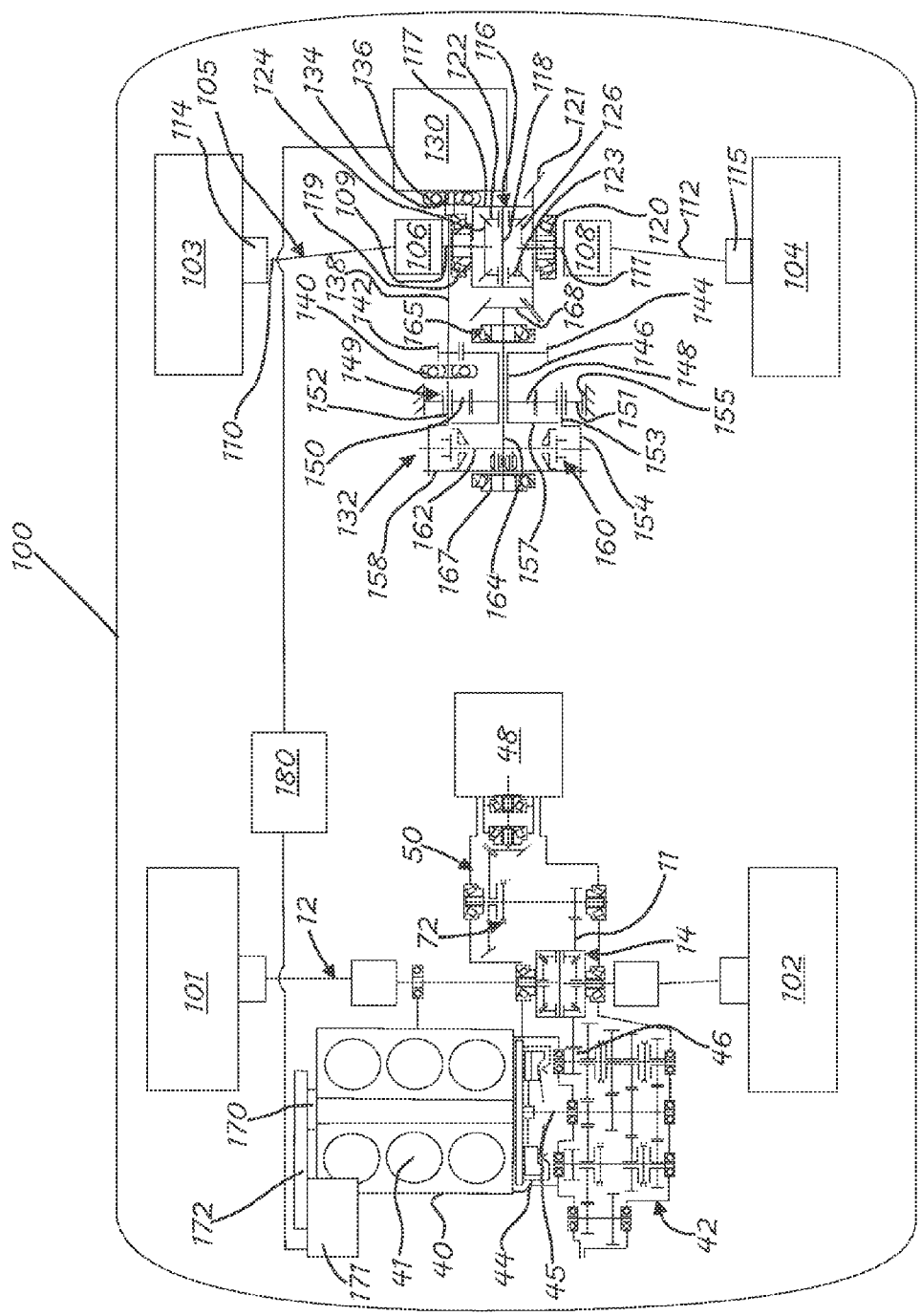
FIG. 3 is a schematic illustration of a product showing a vehicle with a powertrain according to a number of variations.

In a number of variations as illustrated in FIG. 3, a vehicle 100 may include an enhanced electrical capability. Elements in FIG. 3 that are like elements in FIGS. 1 and 2 may be given the same reference numeral. It should be appreciated that the power transfer unit 82 may be substituted in FIG. 3 for the power transfer unit 50. The vehicle 100 may include road wheels 101-104. The road wheels 101 and 102 may be connected to the axle assembly 12, and the road wheels 103 and 104 may be connected to the axle assembly 105. The axle assembly 105 may include inner joints 106 and 108, which may be constant velocity joints that may transfer rotation and may allow for angular variation between the connected components. The joint 106 may connect an axle shaft 109 with an axle shaft 110. The joint 108 may connect an axle shaft 111 with an axle shaft 112. The axle shafts 110 and 112 may be connected with outer joints 114 and 115 respectively, which may be constant velocity joints and may be connected to road wheels 103 and 104, respectively.

In a number of variations the axle assembly 105 may have a differential unit 116. The differential unit 116 may include a cage 117 and may have a pinion shaft 118 that may be engaged at each of its ends with the cage 117. The cage 117 may be rotatable and may be carried by bearings 119 and 120. A gear 121 may be engaged with the cage 117 to rotate therewith. The gear 121 may be a ring gear and may be a bevel gear and may be a spiral bevel right angle gear. The pinion shaft 118 may carry a pinion gear 122 and a pinion gear 123, each of which may be rotatable on the pinion shaft 118. A side gear 124 may mesh with each of the pinion gears 122, 123 and another side gear 126 may mesh with each of the pinion gears 122, 123. Rotation of the cage 117 may cause the pinion gears 122, 123 to rotate, which may cause the side gears 124, 126 to rotate.

In a number of variations the axle shaft 109 may have an end that may be engaged with the side gear 124 to rotate therewith and may have its opposite end engaged with the inner joint 106. The axle shaft 111 may have an end that may be engaged with the side gear 126 to rotate therewith and may have its opposite end engaged with the inner joint 108. Rotation of the gear 121 may cause the cage 117 to rotate and through the 122, 123 and the side gears 124, 126 may cause the axle shafts 109 and 111 to rotate.

In a number of variations an electrical machine 130 may be connected with the axle assembly 105 through a power transfer unit 132. The electrical machine 130 may be a motor or may be a motor-generator, or may be another type of electrical machine to provide power to the power transfer unit 132. A shaft 134, which may be a rotor shaft may extend from the electrical machine 48 and may be supported by bearings 136. The shaft 134 may be engaged with the proximal end of a shaft 138, or may itself, extend past the axle assembly 105 and the resulting distal end may be supported for rotation by bearings 140. A gear 142, which may be a helical gear may be fixed on the shaft 138 to rotate therewith and may be disposed in the power transfer unit 132.

In a number of variations the gear 142 may mesh with and may be positively engaged to rotate with a gear 144, which may be a helical gear and which may have a larger diameter than the gear 142 to provide a reduction there between. The gear 144 may be connected with a torque transfer element 146 that may be tubular in shape and may mesh with and may be positively engaged to rotate with a gear 148. The gear 148 may be a sun gear in a gear set 149, which may be a planetary gear set. The gear 148 may mesh with and may be positively engaged to rotate with gears 150 and 151. The gears 150, 151 may be planet gears and another number may be provided. The gears 150, 151 may rotate on pins 152 and 153, respectively, which may be fixed to a carrier 154. The gears 150, 151 may mesh with and may positively engage a gear 155 which may be a ring or annulus gear and may include internal teeth. The gear 155 may be held or grounded so that it may be fixed from rotation. Rotation of the gear 148 may cause the gears 150, 151 to rotate and to walk around the inside of the gear 155 which may cause the carrier 154 to rotate. The torque transfer element 146 may be connected to or formed with, or the gear 148 may be formed with, a torque transfer element 157 and may rotate therewith. The carrier 154 may be connected with a torque transfer element 158 and may rotate therewith.

In a number of variations a mechanical mechanism 160 may include an engagement element 162 that may be fixed to rotate with a shaft 164. The shaft 164 may be supported for rotation by bearings 165, 167 and may extend through the torque transfer element 146. A gear 168 may be fixed to the shaft 164 to rotate therewith and may mesh with and may be positively engaged to rotate with the gear 121 to drive, or be driven by, the axle assembly 105. The engagement element 162 may selectively disconnect the driven gear set 149 from the shaft 164 or may be shifted to the right as viewed in FIG. 3 to selectively connect the gear set 149 with the shaft 164 from the gear 148 and its connected torque transfer element 157, or may selectively shifted to the left as viewed in FIG. 3 to connect the gear set 149 with the shaft 164 from the carrier 154 and its connected torque transfer element 158. When input may be provided from the gear 148 to the shaft 164, rotational speed from the torque transfer element 146 may be maintained, which may provide a high range mode. When input may be provided from the carrier 154 to the shaft 164 rotational speed from the torque transfer element 146 may be reduced and torque may be increased, which may provide a low range mode.

In a number of variations the engine 40 may include a power take off 170 which may be connected with an electrical machine 171 through a linking element 172. The electrical machine 171 may be a motor or may be a motor-generator, or may be another type of electrical machine that may be driven by the engine 171 and that may drive the engine through the linking element 172 and the power take off 170. The electrical machine 171 may be configured in a belt-alternator-starter arrangement, wherein the linking element 172 may be a pulley drive belt. The electrical machine 171 may operate at a set voltage such as 48 volts. The electrical machine may be used, for example to turn the engine 40 through the linking element 172 and thereby to propel the axle assembly 12, such as when restarting and launching the vehicle form a stop.

In a number of variations the electrical machines 48, 130 and 171 may be connected with the vehicle's battery 180. The vehicle 100 may be propelled via rotation of the road wheels 101, 102 by the engine 40 through the torque converter 44, transmission 42 and axle assembly 12. The engine 40 may be powered by combustion in its cylinders 41, or may be powered by the electrical machine 171 through the linking element 172 and the power take off 170. The disconnect device 72 may be disengaged to selectively disconnect the electrical machine 48 from the axle assembly 12. For efficient power absorption or deployment, the disconnect device 72 may be engaged to drive the electrical machine 48 from the axle assembly 12 or to drive the axle assembly 12 from the electrical machine 48 without going through the engine 40. To recover braking energy from all four road wheels 101-104 in charging the battery 180 according to a number of variations, the disconnect 72 may be engaged to drive the electrical machine 48 from the axle assembly 12 and the mechanical mechanism may be engaged to drive the electrical machine 130 from the axle assembly 105. Charging may be provided from one or both electrical machines 48, 130. Charging may also be provided from the electrical machine 171 when driven by or through the engine 40. Braking energy recovery may be provided from one of the electrical machines 48, 130 providing fore-aft torque biasing between the axle assemblies 12, 105 for handling or traction performance of the vehicle 100. Torque may be provided to brake the axles 12, 105 by generating current in the electrical machines 48, 130. A maximum of braking energy recovery may be provided from the electrical machines 48, 130, without a need to direct recovery torque through the linking element 172. In a number of variations the vehicle 100 may be operated in electric only four, or all wheel drive mode by driving the axle assemblies 12, 105 from the electrical machines 48 and 130 respectively, which may enable the use of a lower power engine 40. The electrical machines 48 and 130 may operate a set voltage that may be higher than the voltage of the electrical machine 171 to provide increased power.

Energy recovery may be maximized by use of both electrical machines 48 and 130 while simultaneously providing improved stability control by controlling torque at each axle assembly 12, 105. A method of controlling vehicle dynamics may be provided by apportioning regen torque to the axle assembly 105 through the electrical machine 130. A method of controlling vehicle dynamics may be provided by apportioning propulsion torque between the axle assembly 12 and the axle assembly 105 through the electrical machines 48 and 130. Through the use of the electrical machines 48 and 130 at the front axle 12 and the rear axle 105, electric drive assistance may increase grade climb and may provide electrical assist launch or creep operation for low speed maneuvering.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include an engine, and a transmission driven by the engine. An axle assembly may be driven by the engine through the transmission. An electrical machine may be connected to the axle assembly. The electrical machine may selectively drive the axle assembly and may be selectively drivable by the engine through the transmission and the axle assembly. A power transfer unit may be engaged between the electrical machine and the axle assembly.

Variation 2 may include the product according to variation 1 wherein the power transfer unit may have a disconnect device disposed between the axle assembly and the electrical machine. The disconnect device may selectively engage the electrical machine with the transmission through the axle assembly and the power transfer unit.

Variation 3 may include the product according to variation 2 and may include a differential unit in the axle assembly. A first gear may be fixed on the differential unit. The transmission may be engaged with the axle assembly at the first gear and the power transfer unit may be engaged with the axle assembly at the first gear.

Variation 4 may include the product according to variation 2 and may include a differential unit that may have a cage and may be included in the axle assembly. A first gear may be fixed on the cage. The transmission may be engaged with the axle assembly at the first gear and the power transfer unit may be engaged with the axle assembly at the cage.

Variation 5 may include the product according to any of variations 1 through 4 wherein the engine may have a power take off. A linking element may be engaged with the power take off and a second electrical machine may be engaged with the linking element. The second electrical machine may be selectively driven by the engine and the second electrical machine may selectively drive the engine.

Variation 6 may include the product according to variation 5 and may include a rear axle assembly. A third electrical machine may be engaged with the rear axle assembly. The third electrical machine may be selectively driven by the rear axle assembly and may selectively drive the rear axle assembly.

Variation 7 may include the product according to variation 6 and may include a hybrid all wheel drive mode, wherein the engine may drive the axle assembly and the third electrical machine may drive the rear axle assembly.

Variation 8 may include the product according to variation 6 wherein the third electrical machine may operate as a motor providing traction torque to the rear axle assembly and may operate as a generator providing braking torque to the rear axle assembly.

Variation 9 may include the product according to variation 8 wherein the traction or braking torque may be apportioned between the axle assembly and the rear axle assembly.

Variation 10 may include the product according to variation 9 and may include a disconnect mechanism selectively connecting and disconnecting the electrical machine from the axle assembly. The disconnect mechanism may be selectively engaged to apportion traction or braking torque.

Variation 11 may include the product according to variation 8 and may include an electric only all wheel drive mode wherein the electrical machine may drive the axle assembly and the third electrical machine may drive the rear axle assembly and the engine is disengaged.

Variation 12 may include the product according to any of variations 1 through 4 wherein the engine may have a power take off. A second electrical machine may be included and a linking element may connect the second electrical machine to the power take off. The axle assembly may drive the electrical machine and may not drive the second electrical machine to recover energy.

Variation 13 may include a product that may include an engine. A transmission may be driven by the engine. An axle assembly may be driven by the engine through the transmission. An electrical machine may be connected to the axle assembly. The electrical machine may selectively drive the axle assembly and may be selectively drivable by the engine through the transmission and the axle assembly. A power transfer unit may be engaged between the electrical machine and the axle assembly. The power transfer unit may include a disconnect mechanism selectively connecting and disconnecting the electrical machine from the axle assembly.

Variation 14 may include the product according to variation 13 wherein the power transfer unit may include a first bevel gear that may be fixed to and driven by the electrical machine. A shaft may be included in the power transfer unit. A second bevel gear may rotate around the shaft and may be positively engaged with the first bevel gear. The disconnect device may include a first element fixed to the shaft and may include a second element fixed to the second bevel gear.

Variation 15 may include the product according to variation 13 wherein the axle assembly may include a differential unit that may have a cage. The differential unit that may be engaged with a first gear through which input may be provided to the axle assembly. The transmission may include a second gear that may provide output from the transmission and may be positively engaged with the first gear. The power transfer unit may include a third gear that may provide output from the power transfer unit and may be positively engaged with the first gear.

Variation 16 may include the product according to variation 15 wherein the power transfer unit may include a first bevel gear that may be fixed to, and may be driven by, the electrical machine. A shaft may be included in the power transfer unit. A second bevel gear may rotate around the shaft and may be positively engaged with the first bevel gear.

The disconnect device may include a first element fixed to the shaft and may include a second element fixed to the second bevel gear.

Variation 17 may include the product according to variation 16 wherein the third gear may be fixed on the shaft.

Variation 18 may include the product according to any of variations 13 through 17 wherein the engine may have a power take off. A linking element may be engaged with the power take off and a second electrical machine may be engaged with the linking element. The second electrical machine may be selectively driven by the engine and the second electrical machine may selectively drive the engine.

Variation 19 may include the product according to variation 18 and may include a rear axle assembly. A third electrical machine may be engaged with the rear axle assembly. The third electrical machine may be selectively driven by the rear axle assembly and may selectively drive the rear axle assembly.

Variation 20 may include a product that may include an engine. A transmission may be driven by the engine. An axle assembly may be driven by the engine through the transmission. An electrical machine may be connected to the axle assembly. A power transfer unit may be engaged between the electrical machine and the axle assembly. The axle assembly may include a differential unit that may have a first gear through which input may be provided to the axle assembly. The transmission may include a second gear that may provide output from the transmission and may be positively engaged with the first gear. The power transfer unit may include a third gear that may provide output from the power transfer unit and may be positively engaged with the first gear.

What is claimed is:

1. A product comprising an engine, a transmission driven by the engine, an axle assembly driven by the engine through the transmission, an electrical machine connected to the axle assembly, the electrical machine selectively driving the axle assembly and selectively drivable by the engine through the transmission and the axle assembly, and a power transfer unit engaged between the electrical machine and the axle assembly, wherein the power transfer unit has a disconnect device disposed between the axle assembly and the electrical machine selectively engaging the electrical machine with the transmission through the axle assembly and the power transfer unit.

2. The product according to claim 1 wherein the engine and transmission are disposed completely on a forward side of the axle assembly and the electrical machine is disposed completely on a rearward side of the axle assembly.

3. The product according to claim 1 further comprising a differential unit included in the axle assembly and a first gear fixed on the differential unit, the transmission engaged with the axle assembly at the first gear and the power transfer unit engaged with the axle assembly at the first gear.

4. The product according to claim 1 further comprising a differential unit that has a cage and is included in the axle assembly, a first gear fixed on the cage, the transmission engaged with the axle assembly at the first gear and the power transfer unit engaged with the axle assembly at the cage.

5. The product according to claim 1 wherein the engine has a power take off and further comprising a linking element engaged with the power take off and a second electrical machine engaged with the linking element, the second electrical machine selectively driven by the engine and the second electrical machine selectively driving the engine.

6. The product according to claim 5 further comprising a rear axle assembly and a third electrical machine engaged with the rear axle assembly, the third electrical machine selectively driven by the rear axle assembly and selectively driving the rear axle assembly.

7. The product according to claim 6 further comprising a hybrid all wheel drive mode wherein the engine drives the axle assembly and the third electrical machine drives the rear axle assembly.

8. The product according to claim 6 wherein the third electrical machine operates as a motor providing traction torque to the rear axle assembly and operates as a generator providing braking torque to the rear axle assembly.

9. The product according to claim 8 wherein the traction or braking torque is apportioned between the axle assembly and the rear axle assembly.

10. The product according to claim 9 further comprising an engageable disconnect mechanism selectively connecting and disconnecting the electrical machine from the axle assembly wherein the disconnect mechanism is selectively engaged to apportion traction or braking torque.

11. The product according to claim 8 further comprising an electric only all wheel drive mode wherein the electrical machine drives the axle assembly and the third electrical machine drives the rear axle assembly.

12. The product according to claim 1 wherein the engine has a power take off and a second electrical machine with a linking element connecting the second electrical machine to the power take off, wherein the axle assembly drives the electrical machine and not the second electrical machine to recover energy.

13. A product comprising an engine, a transmission driven by the engine, an axle assembly driven by the engine through the transmission, an electrical machine connected to the axle assembly, the electrical machine selectively driving the axle assembly and selectively drivable by the engine through the transmission and the axle assembly, and a power transfer unit engaged between the electrical machine and the axle assembly, wherein the power transfer unit includes a disconnect mechanism selectively connecting and disconnecting the electrical machine from the axle assembly.

14. The product according to claim 13 wherein the power transfer unit includes a first bevel gear fixed to and driven by the electrical machine, a shaft, and a second bevel gear rotating around the shaft and positively engaged with the first bevel gear, wherein the disconnect device mechanism includes a first element fixed to the shaft and a second element fixed to the second bevel gear.

15. The product according claim 13 wherein the axle assembly includes a differential unit with a cage and a first gear through which input is provided to the axle assembly, the transmission includes a second gear providing output from the transmission and positively engaged with the first gear and the power transfer unit includes a third gear providing output from the power transfer unit and positively engaged with the first gear.

16. The product according to claim 15 wherein the power transfer unit includes a first bevel gear fixed to and driven by the electrical machine, a shaft, and a second bevel gear rotating around the shaft and positively engaged with the first bevel gear, wherein the disconnect mechanism includes a first element fixed to the shaft and a second element fixed to the second bevel gear.

17. The product according to claim 16 wherein the third gear is fixed on the shaft.

18. The product according to claim 13 wherein the engine has a power take off and further comprising a linking element engaged with the power take off and a second electrical machine engaged with the linking element, the second electrical machine selectively driven by the engine and the second electrical machine selectively driving the engine.

19. The product according to claim 18 further comprising a rear axle assembly and a third electrical machine engaged with the rear axle assembly, the third electrical machine selectively driven by the rear axle assembly and selectively driving the rear axle assembly.

20. A product comprising an engine, a transmission driven by the engine, an axle assembly driven by the engine through the transmission, an electrical machine connected to the axle assembly, and a power transfer unit engaged between the electrical machine and the axle assembly, wherein the axle assembly includes a differential unit with a first gear through which input is provided to the axle assembly, the transmission includes a second gear providing output from the transmission and that is connected with the first gear, and the power transfer unit includes a third gear providing output from the power transfer unit and that is connected with the first gear, wherein the power transfer unit has a disconnect device disposed between the axle assembly and the electrical machine selectively engaging the electrical machine with the transmission through the axle assembly and the power transfer unit.

21. The product according to claim 20 wherein the transmission is engaged with the axle assembly at the first gear and the power transfer unit is engaged with the axle assembly at the first gear.

22. The product according to claim 20 wherein the differential unit that has a cage and is included in the axle assembly, the first gear is fixed on the cage, the transmission engaged with the axle assembly at the first gear and the power transfer unit engaged with the axle assembly at the cage.

23. The product according to claim 20 wherein the engine has a power take off and further comprising a linking element engaged with the power take off and a second electrical machine engaged with the linking element, the second electrical machine selectively driving the engine.

24. The product according to claim 23 further comprising a rear axle assembly and a third electrical machine engaged with the rear axle assembly, the third electrical machine selectively driven by the rear axle assembly and selectively driving the rear axle assembly.

25. The product according to claim 24 wherein the third electrical machine operates as a motor providing traction torque to the rear axle assembly and operates as a generator providing braking torque to the rear axle assembly.

* * * * *